United States Patent
Yamada et al.

(12)

(10) Patent No.: US 6,795,216 B1
(45) Date of Patent: Sep. 21, 2004

(54) PRINT SYSTEM AND PRINT METHOD

(75) Inventors: Satoru Yamada, Tokyo (JP); Kouhei Ishikawa, Kawasaki (JP)

(73) Assignee: Canon Finetech Inc., Ibaraki (JP)

( * ) Notice: Subject to any disclaimer, the term of this patent is extended or adjusted under 35 U.S.C. 154(b) by 0 days.

(21) Appl. No.: 09/328,464

(22) Filed: Jun. 9, 1999

(30) Foreign Application Priority Data

Jun. 12, 1998 (JP) .......................................... 10-165615

(51) Int. Cl.[7] .............................................. H04N 1/21
(52) U.S. Cl. ..................... 358/3.21; 358/468
(58) Field of Search .............................. 358/3.21–3.22, 358/1.9, 448, 461, 518, 523, 468

(56) References Cited

U.S. PATENT DOCUMENTS

| | | | |
|---|---|---|---|
| 4,313,124 A | 1/1982 | Hara ....................... | 346/140 R |
| 4,345,262 A | 8/1982 | Shirato et al. .......... | 346/140 R |
| 4,459,600 A | 7/1984 | Sato et al. ............... | 346/1.1 |
| 4,463,359 A | 7/1984 | Ayata et al. ............. | 346/1.1 |
| 4,558,333 A | 12/1985 | Sugitani et al. ......... | 346/140 R |
| 4,910,528 A | * 3/1990 | Firl et al. ................ | 347/17 |
| 5,016,027 A | * 5/1991 | Uebbing .................... | 347/236 |
| 5,528,270 A | 6/1996 | Tajika et al. ............. | 347/19 |
| 5,818,501 A | * 10/1998 | Ng et al. ................... | 347/237 |
| 5,825,394 A | * 10/1998 | Gilbert et al. ............ | 347/191 |

FOREIGN PATENT DOCUMENTS

| | | | | |
|---|---|---|---|---|
| EP | 729115 A2 | * | 8/1996 | ........... G06K/15/10 |
| EP | 0 764 535 A1 | | 3/1997 | ............ B41J/2/165 |
| EP | 1029698 A2 | * | 8/2000 | ........... B41J/29/393 |
| JP | 54-056847 | | 5/1979 | ............ B41M/5/26 |
| JP | 59-123670 | | 7/1984 | ............ B41J/3/04 |
| JP | 59-138461 | | 8/1984 | ............ B41J/3/04 |
| JP | 60-072160 | | 4/1985 | ............ B41J/3/04 |
| JP | 96-156802 | | 6/1996 | ............ B41J/2/21 |
| JP | 96-156803 | | 6/1996 | ............ B41J/2/01 |
| JP | 96-156813 | | 6/1996 | ............ G06F/3/12 |
| JP | 96-156820 | | 6/1996 | ............ G06F/3/12 |
| JP | 96-156822 | | 6/1996 | ............ B41J/29/38 |
| JP | 96-156932 | | 6/1996 | ............ B41J/2/01 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

To simplify the management of unique information on printing apparatuses, the printing apparatus sends the HS data unique to a particular print head to the computer terminal equipment which, based on the HS data, corrects the print data and sends the corrected print data to the printing apparatus.

17 Claims, 9 Drawing Sheets

404

REFERENCE TABLE NUMBER

| n | |
|---|---|
| n=1 | 0 |
| n=2 | 36 |
| n=3 | 31 |
| n=4 | 13 |
| n=5 | 63 |
| n=6 | 51 |
| ⋮ | ⋮ |
| n=2304 | 19 |

FIG.5

PRINT SYSTEM AND PRINT METHOD

This application is based on Patent Application No. 165615/1998 filed on Jun. 12, 1998 in Japan, the content of which is incorporated hereinto by reference.

BACKGROUND OF THE INVENTION

1. Field of the Invention

The present invention relates to a printing system and a printing method in which a printing apparatus prints an image according to print data transmitted from a control apparatus.

2. Description of the Prior Art

First Conventional Example

Generally, a print head used in an inkjet printing apparatus ejects ink through ink paths that form a plurality of nozzles or ink ejection orifices. In the printing apparatus using such a print head, there may be minute variations in shape among the nozzles forming ink paths and also errors in the nozzle shapes during the nozzle forming process. Because of these variations, it is often not possible to produce a uniform image by ejecting inks onto a print medium even when a command signal to form a uniform image is issued.

A method for correcting unevenness in print density, the cause of uneven image, and for making the density uniform is already known as head shading (HS).

FIG. 1 is a schematic block diagram of an apparatus that actually employs the head shading (hereinafter also referred to as "HS") technique. The apparatus shown in FIG. 1 incorporates three systems, a reading unit (image exposing unit) 101, an image processing section 102, and a print (image forming) section 103. A conventional HS technology will be described below.

In FIG. 1, the reading unit 101 reads an original document and inputs a result of printing to obtain a density pattern required to perform HS. The image processing section 102 performs calculation processing on an image read by the reading unit 101, such as color correction and value determination processing (n=2, 3, 4 . . . ). The HS processing is also included in these calculation processing. The image forming section 103 takes in data, which was read by the reading unit 101 and processed by the image processing section 102, and then, based on this data, forms an image on a print medium by each print head 104.

In the printing apparatus of this configuration, the image forming section 103 forms an image on a print medium by using the print heads 104 according to a test pattern that is used to form an image of a specified density. The result of printing is read by the reading unit 101. The data read by the reading unit 101 is sent to the image processing section 102 where it is used to generate data required to perform HS processing (hereinafter referred to as "HS data"). The HS data 105 is used to correct density-varying spots observed in the printing result produced by each of the print heads 104. That is, the print heads 104 each have a plurality of ink paths that form nozzles or ink ejection orifices and, when there are variations in the amount of ink ejected from these ink paths, density-varying spots are formed in the printing result. The HS data 105 is used to correct the density-varying spots and make them inconspicuous. That is, the HS data 105 is used as data for directly correcting an image input signal from the reading unit 101 for each print head 104. Based on the corrected output signal value, the print heads 104 in the image forming section 103 print an image.

Second Conventional Example

There is a print system which has configured independently of each other the original exposing section (reading unit), the image processing system and the image forming section, like a system consisting of an image scanner, a computer terminal equipment and a printer. As to this system a variety of improvement proposals have been made, which include Japanese Patent Application Laid-Open Nos. 8-156932, 8-156803, 8-156813, 8-156820, 8-156822 and 8-156802.

One of these proposals deals with a case where a plurality of printing apparatuses are connected to a computer terminal equipment. In this configuration, correction information on all printing apparatuses which may be connected to the computer terminal equipment is constructed into database and stored in advance in a storage device connected to the computer terminal equipment. When printing, the computer terminal equipment sends a serial number to a printing apparatus to check the detail of the printing apparatus. Based on the result of the check, the computer uses the correction information corresponding to that printing apparatus and performs printing. In this way, the printing apparatus to be operated and the corresponding correction information are matched. Of the above proposals some include date information in the management of the correction information.

In the above proposals, however, the correction information unique to a particular printing apparatus exists separately and independently of the printing apparatus. Thus, the user must obtain in advance correction information about all the printing apparatuses that may be connected to the computer terminal equipment and manage these information. Further, as the number of printing apparatuses increases, the correction information on these printing apparatuses is accumulated in the storage device connected to the computer terminal equipment, thus increasing the amount of data stored. An increase in the accumulated data in turn makes erroneous operations and other troubles on the part of the user more likely.

SUMMARY OF THE INVENTION

An object of the present invention is to provide a printing system and a printing method, both capable of simplifying the management of information on individual printing apparatuses.

In a first aspect of the present invention, there is provided a printing system comprising:

a printing apparatus capable of printing an image according to print data on a print medium by using a print head having a plurality of print elements; and a controller for sending the print data to the printing apparatus;

wherein the printing apparatus has first and second holding means for holding first unique information unique to the printing apparatus and second unique information unique to the print head, respectively;

wherein the controller includes:

first and second registration means capable of registering the first and second unique information sent from the printing apparatus, respectively;

a request means for requesting the printing apparatus to send the second unique information when the registered content of the first and second registration means does not agree with the first and second unique information in the printing apparatus; and a conversion means for converting the print data according to the second unique information registered in the second registration means.

In the second aspect of the present invention, there is provided a printing method comprising the steps of:
- sending print data from a controller to a printing apparatus; and
  - printing an image on a print medium according to the print data by using a print head having a plurality of printing elements;
    - wherein the printing apparatus sends unique information unique to the print head to the controller, and the controller converts the print data according to the unique information and sends the converted print data to the printing apparatus.

The present invention has stored in individual printing apparatuses correction information unique to each printing apparatus. A controller such as a computer terminal equipment requests unique information as required from a desired printing apparatus connected to it. This can eliminate the work on the part of a user, including preparation and management of unique information corresponding to the individual printing apparatuses.

Further, because individual printing apparatuses hold their unique information respectively, the controller such as a computer terminal equipment does not need to pool the unique information on individual printing apparatuses. The storage device on the controller side needs only to hold unique information on the printing apparatuses currently connected to the controller. For example, when one printing apparatus is selectively connected to the controller, only the unique information on that printing apparatus needs to be registered in the controller, thus it is prevented that the amount of data stored in the storage device on the controller side from increasing.

The unique information on individual printing apparatuses to be registered in the storage device on the controller side can be changed and updated for each print head. For example, by managing date data, version of information, and serial numbers, it is possible to automatically match the printing apparatuses to their corresponding unique information without the user having to become conscious of their correspondence.

As a result, the burden of the user is alleviated, allowing the user to easily establish the correspondence between the printing apparatuses and their unique information and to obtain appropriate printed result easily and reliably.

Further, in the invention the unique information corresponding to a print head installed in a printing apparatus is held in the printing apparatus and, at time of printing, the unique information is downloaded from the printing apparatus to the controller. The controller uses the downloaded unique information in the conversion processing such as correction of print data. This enables an overall management of the print heads in the printing apparatuses and their corresponding unique information.

Therefore, it is not necessary to manage the unique information on printing apparatuses separately by the printing apparatuses and the controller, as has been done in the conventional printing system. Further, in a storage device connected to the controller such as a computer terminal equipment, there is no need to manage a plurality of unique information, such as HS data of the printing apparatuses to be connected to the controller, as has been required conventionally.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is an explanatory diagram showing reference table numbers in the HS correction data of FIG. 4;

DETAILED DESCRIPTION OF THE PREFERRED EMBODIMENTS

Embodiments of this invention will be described by referring to the accompanying drawings.

Figure 1:
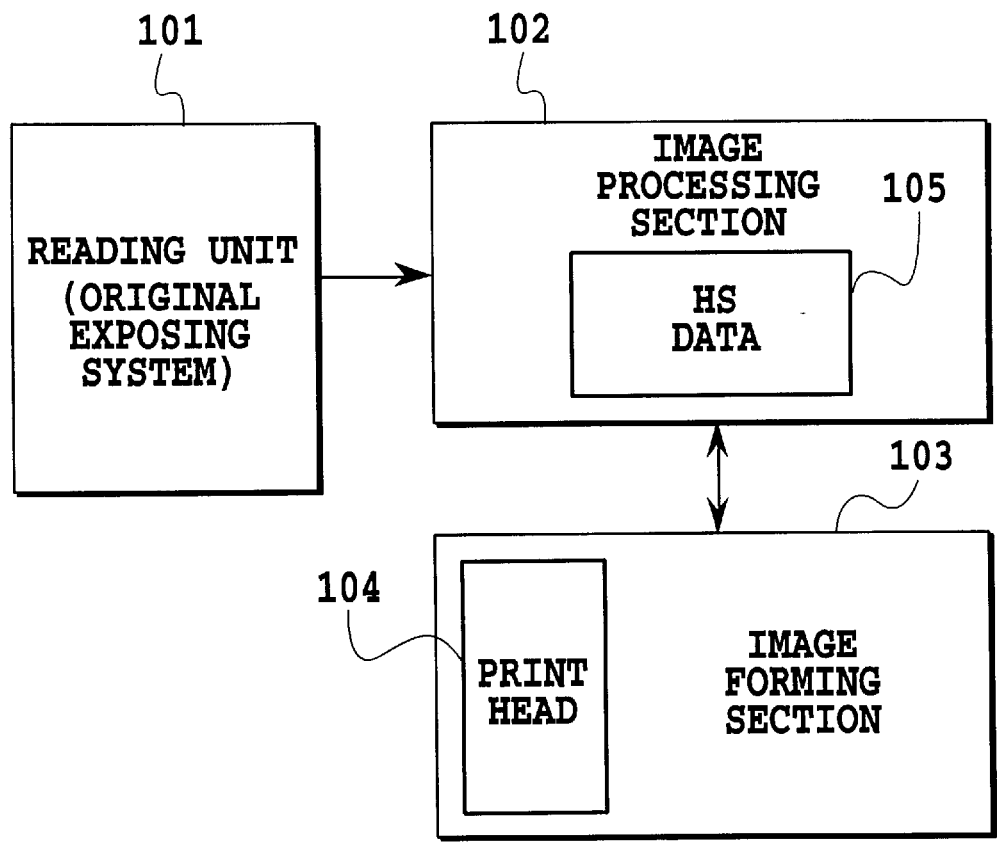
FIG. 1 is a schematic block diagram of a printing system that realizes the conventional head shading.
Figure 2:
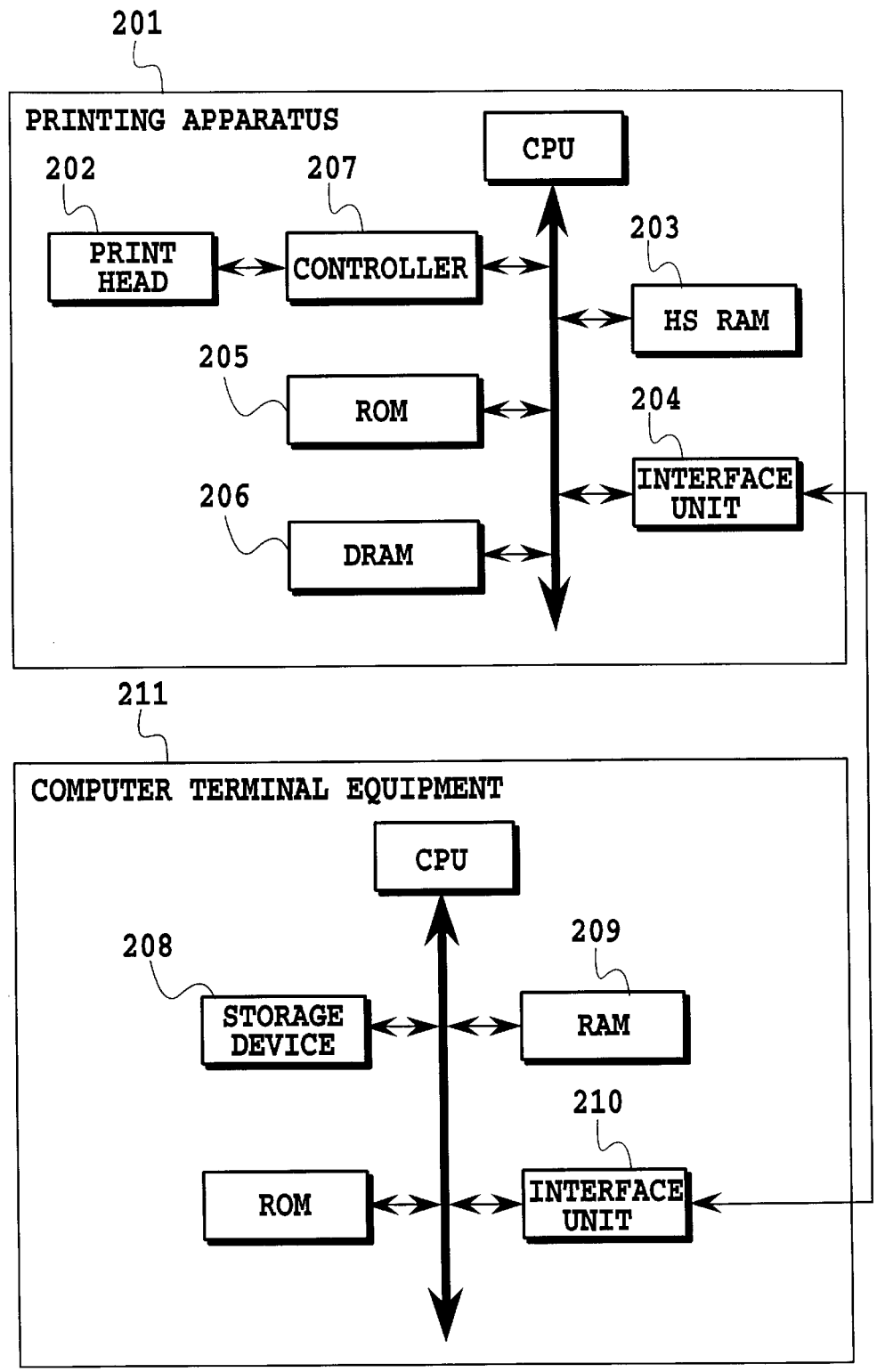
FIG. 2 is a schematic diagram of a print system according to one embodiment of the invention.

FIG. 2 is a schematic diagram showing a printing system that can apply the present invention.

A printing apparatus 201 has installed therein a plurality of print heads 202 formed with a plurality of ink ejection orifices or nozzles. These print heads 202 are controlled by a controller 207. The printing apparatus 201 also has a DRAM 206, a ROM 205 and a RAM 203. The DRAM 206 constitutes an area for buffering print data transferred from a computer terminal equipment 211. The ROM 205 is an area for storing programs. The RAM 203 constitutes an area for storing HS data to implement the head shading (simply referred to as "HS"). An interface unit 204 communicates with an interface unit 210 of the computer terminal equipment 211 or the controller. These interface units 204 and 210 are usually connected with a cable.

In this example, we will take up a case where the printing apparatus 201 is connected to the computer terminal equipment 211 with a cable.

Figure 3:
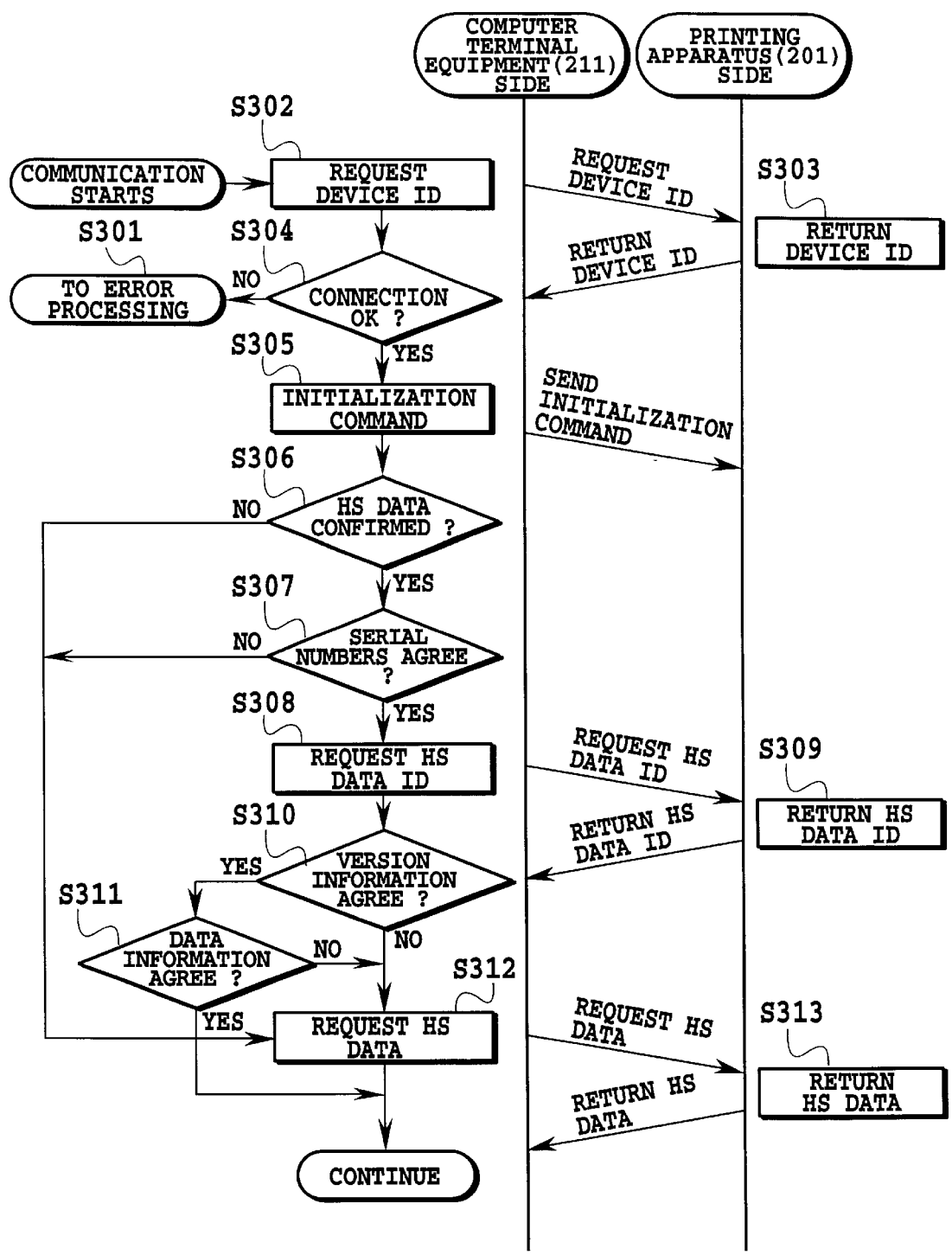
FIG. 3 is an explanatory diagram showing a communication procedure performed by the printing system of FIG. 2.

FIG. 3 shows the procedure of communication between the computer terminal equipment 211 and the printing apparatus 201 connected to it when printing is performed.

First, the computer terminal equipment 211 starts communicating with the printing apparatus 201 and sends a "device ID request" to the printing apparatus 201 to check whether the printing apparatus 201 is properly connected to the computer terminal equipment 211 (step S302). The printing apparatus 201 returns information on the printing apparatus 201 including a serial number to the computer terminal equipment 211 (step S303). Based on the returned signal, the computer terminal equipment 211 decides whether or not the printing apparatus 201 is connected to it (step S304).

When it is decided that the printing apparatus 201 is not connected, the computer terminal equipment 211 performs error processing (step S301). When the printing apparatus 201 is confirmed to be connected, the computer terminal equipment 211 checks whether HS data is present in a storage device 208 connected to the computer terminal equipment 211 (step S306). When the HS data is not found, the computer terminal equipment 211 issues an HS data read request to the printing apparatus 201 (step S312). The printing apparatus 201 reads the HS data for all print heads 202 described later from the HS RAM 203 and returns the HS data to the computer terminal equipment 211 (step S313).

If the HS data exists in the storage device 208, the computer terminal equipment 211 compares the serial number returned from the connected printing apparatus 201 with the serial number of the HS data contained in the storage device 208 (step S307). When they do not agree, i.e., when the HS data in the storage device 208 is not for the print heads 202 of the printing apparatus 201 connected to the computer terminal equipment 211, the processing proceeds to step S312. In step S312, the computer terminal equipment 211 requests HS data for all print heads 202, as is done when HS data does not exist in the storage device 208. In step S307, when the serial number of the printing apparatus 201 coincides with the serial number stored in the storage device 208, the processing proceeds to step S308. That is, when the HS data in the storage device 208 is for the print heads 202 of the printing apparatus 201 connected to the computer terminal equipment 211, the processing proceeds step S308. The step 308 requests only header information (hereinafter referred to "HS data ID") attached to the HS data.

Now, HS data and HS data ID will be explained.

Figure 4:
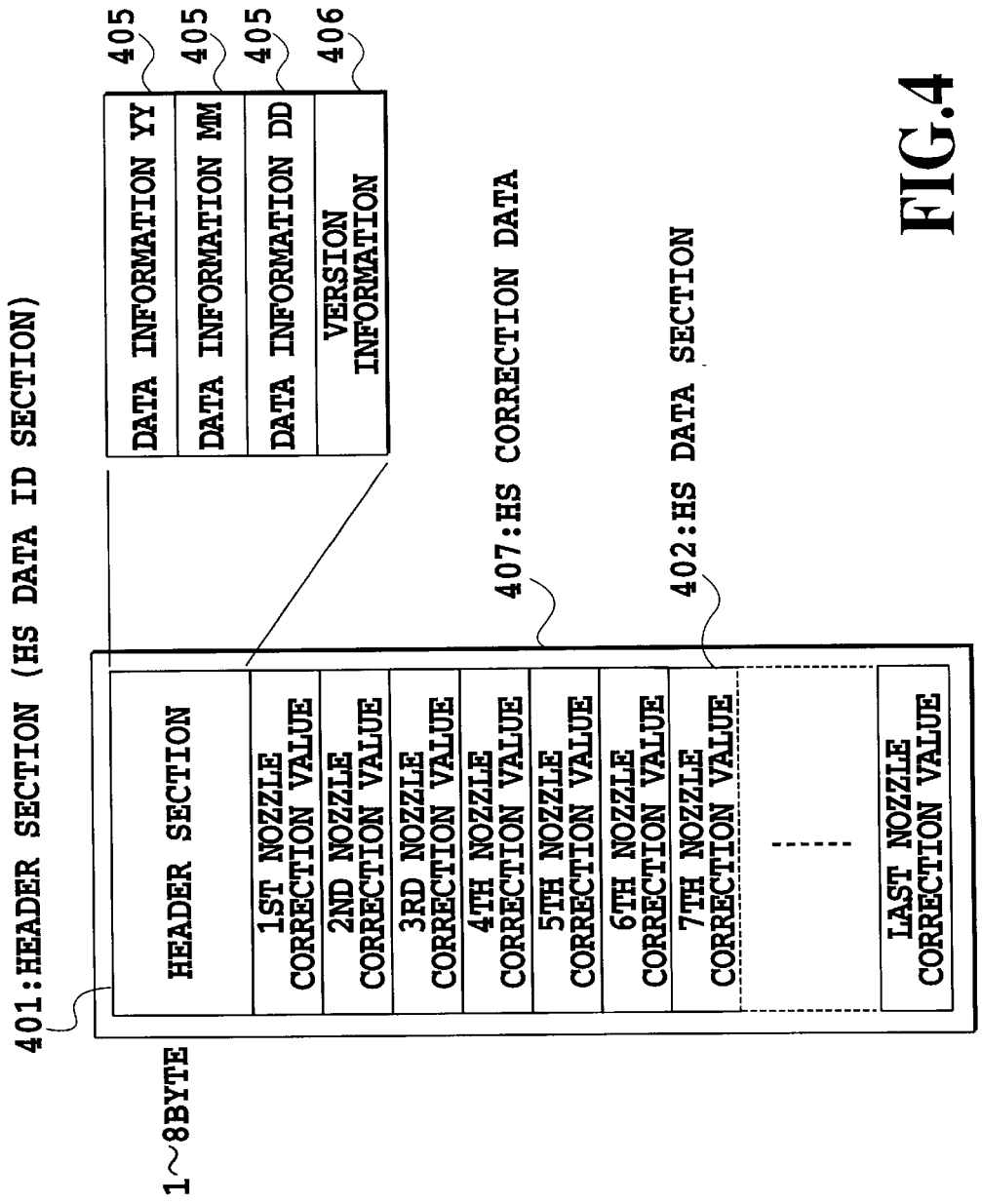
FIG. 4 is an explanatory diagram showing head shading (HS) correction data used in the embodiment of the invention.

As shown in FIG. 4, the HS data, which is a combination of an HS data ID section 401 as a header and an HS data section 402, constitutes correction information for one print head 202. In the case of a printing apparatus 201 using four print heads 202, for example, there are four such HS data assigned. The HS data is stored in HS RAM 203 on printing apparatus 201 side. The HS data ID section 401 and the HS data section 402, combined together, are also called HS correction data 407.

The HS data ID section 401 represents information on the HS data section 402. That is, the HS data ID section 401 includes date information 405 on year (YY), month (MM) and day (DD) when the HS data section 402 was generated, and version information 406 used to establish matching with HS gamma table 505 described later. The HS data section 402 has the same number of data items as there are nozzles that form one print head 202. The HS data section 402 contains reference information 404 about correction gamma table that defines each pixel to be formed by each nozzle. The reference information 404 contains, as shown in FIG. 5, table numbers of gamma table (reference table numbers) as data for each pixel that corresponds to a nozzle number (n). The gamma table is used to correct input data on pixel density. In this example, there are a total of 64 reference table numbers 404 from "0" to "63". At time of HS processing, a gamma table of the corresponding table number is referenced to correct the input data concerning the density of each pixel. The input data is referred to as "input pixel data" and the corrected data as "output pixel data."

Figure 6:
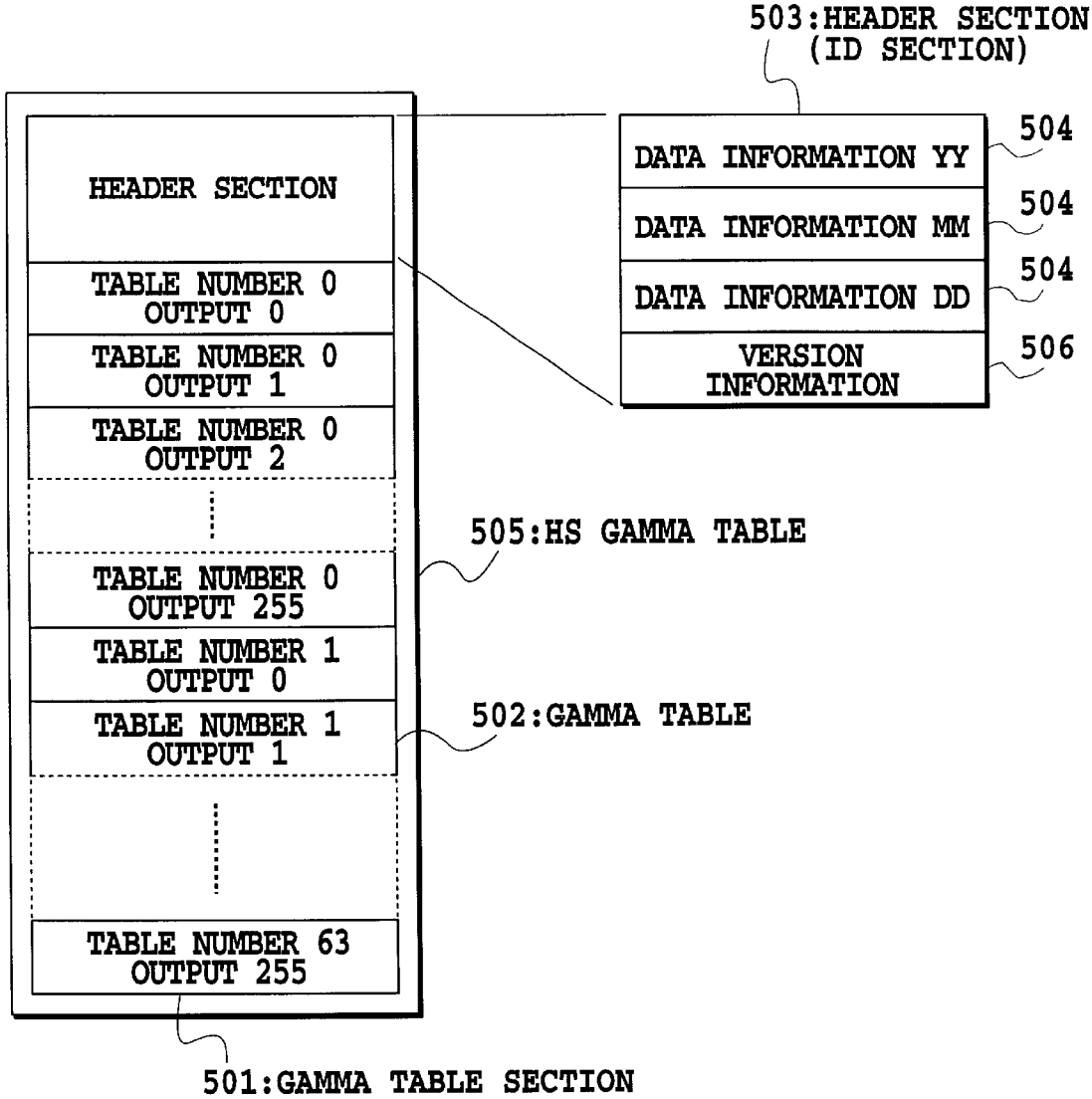
FIG. 6 is an explanatory diagram showing HS gamma table used in the embodiment of the invention.
Figure 7:
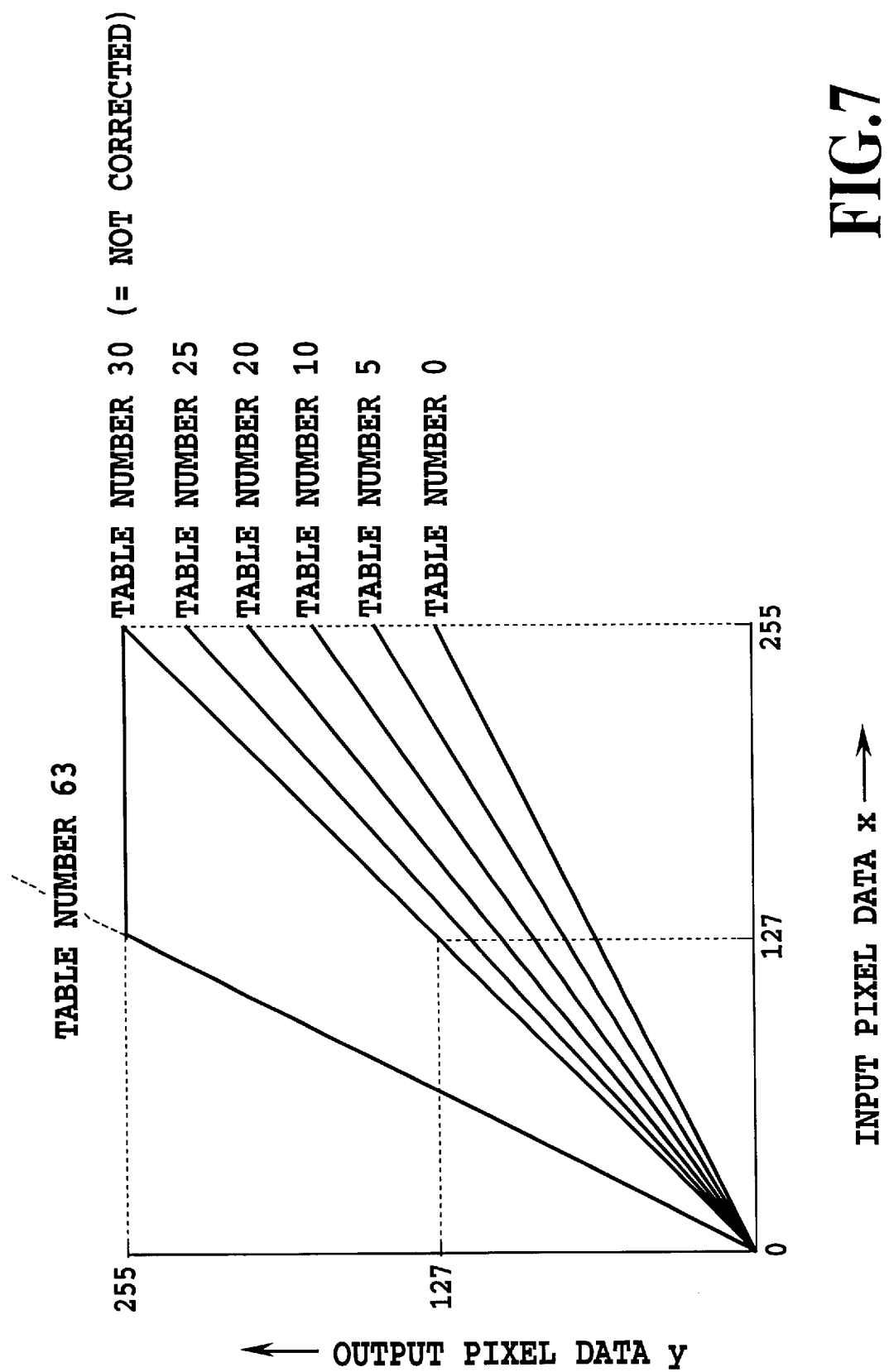
FIG. 7 is an explanatory diagram showing table values of the HS gamma table of FIG. 6.

Next, the HS gamma table stored in the storage device 208 on the computer terminal equipment 211 side will be explained by referring to FIGS. 6 and 7.

The HS gamma table 505, like the HS correction data 407 described above, has an ID section 503 as a header and a gamma table section 501. The gamma table section 501 contains gamma tables 502 that correspond to the reference table numbers 404 stored in the HS data section 402. The gamma tables 502 will be detailed later. The ID section 503 stores date information 504 on year (YY), month (MM) and day (DD) when the HS gamma table 505 was generated, and version information 506.

The version information 506 must agree to the version information 406 of the HS correction data 407. The reason for this is that the HS correction data 407 is the data used to reference the gamma tables 502. The second reason is that the HS correction data 407 is updated in the HS RAM 203 of the printing apparatus 201. The third reason is that the HS gamma table 505 updates device driver information necessary for using the printing apparatus 201. For these reasons, it is necessary to check, at the start of printing, whether the version of the HS correction data in the storage device 208 that is used for printing matches the version of the HS correction data in the HS RAM 203 of the printing apparatus 201.

In this example, the input pixel data and the output pixel data both have 8 bits for each pixel. Therefore, the gamma tables 502, as shown in FIG. 7, must have output values from 0 to 255 for the input values from 0 to 255. For this reason, the gamma table section 501 is constructed such that each gamma table 502 has 256 bytes. The value y of the output pixel data is determined by taking the selected gamma table 502 and the input pixel data value x as parameters. Specifications of values and table arrangement are not limited to those described above in this example.

Now, returning to FIG. 3, we will explain about the processing after the request for the header section (ID section) of the HS correction data 407 (step S308).

In step S308, the computer terminal equipment 211 requests an ID of the HS correction data 407 from the printing apparatus 201. In response to this request, the printing apparatus 201 sends back the HS data ID section 401 (step S309). The computer terminal equipment 211 compares, for each print head 202, the version information 406 of the HS data ID section 401 returned from the printing apparatus 201 with the version information 506 of the ID section 503 stored in the storage device 208 (step S310). If any of the version information 406, 506 disagrees, the computer terminal equipment 211 requests HS data (step S312). In response to the request, the printing apparatus 201 returns the HS correction data 407 for all print heads 202 (step S313). The computer terminal equipment 211 receives the HS correction data 407 and updates the data in the storage device 208. In this case, even when the version information 406, 506 differs, as long as their relationship falls within a predetermined range of history, for example, within a predetermined range of version, they may be determined as being equal.

In step S310, when all the version information 406, 506 agree, the processing proceeds to step S311, where the date information 405 and 504 are compared for each print head 202. Then, for only those print heads 202 for which the date information 405, 504 disagree, the computer terminal equipment 211 requests the HS correction data 407 (HS data request (step S312)). The computer terminal equipment 211 receives the HS correction data 407 and stores them in the storage device 208. In that case, even when the date information 405 and 504 differ, as long as their relationship falls within a predetermined range of history, they may be determined as being identical. For example, if the deviation between date information 405 and 504 is within a predetermined period, it is possible not to request the HS correction data 407 corresponding to these information data 405, 504.

In this way, the HS correction data stored in the storage device 208 connected to the computer terminal equipment 211 is matched, for each print head 202, to the HS correction data stored in the HS RAM 203 of the printing apparatus 201. Then, based on the HS correction data stored in the storage device 208, the computer terminal equipment 211 corrects print data, i.e., performs HS correction. The printing apparatus 201 receives the corrected print data and prints them out.

Figure 8:
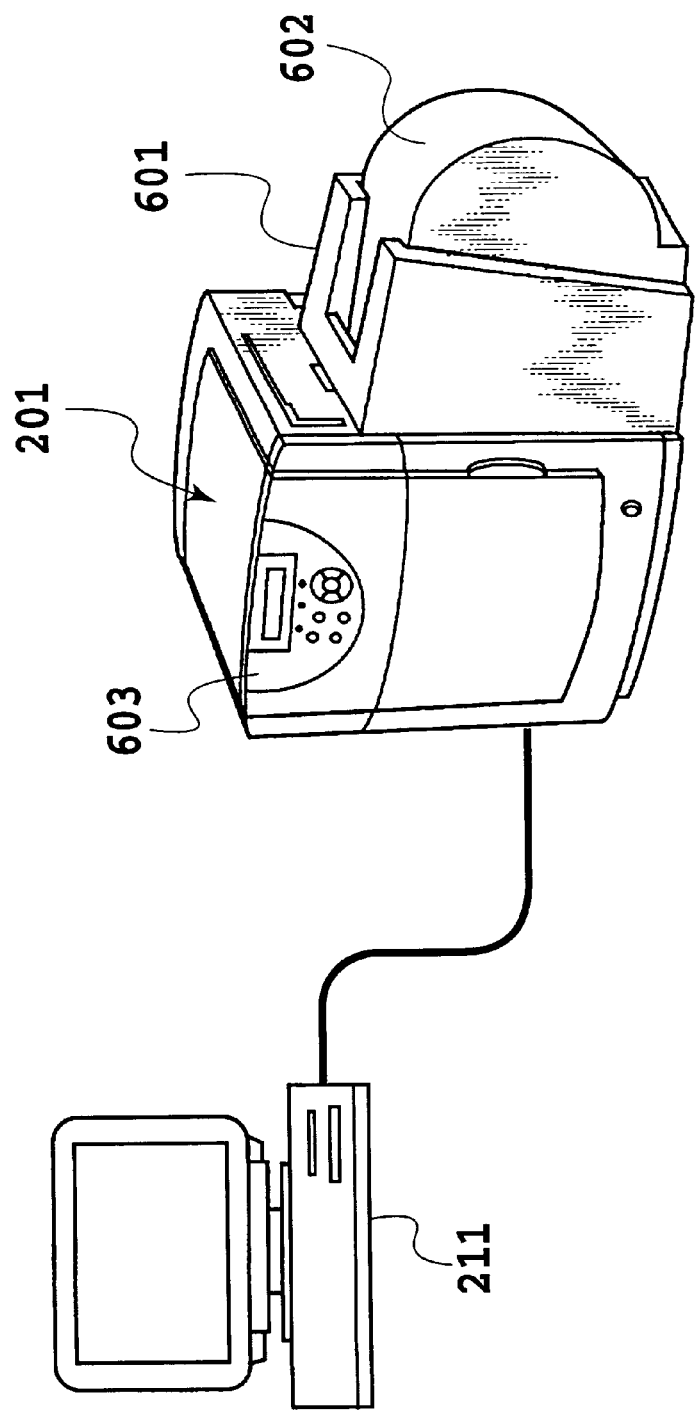
FIG. 8 is a perspective view of a color label printing apparatus that can apply the present invention.

FIG. 8 is a perspective view of a color label printing system as one form of the printing system that can apply the present invention.

The color label printing apparatus, as the printing apparatus 201, has a paper roll holder 601 for holding a roll of paper 602 as a medium to be printed on. According to the print data received from the computer terminal equipment 211 through a printer cable, the printing apparatus 201 prints on the roll of paper 602. Designated 603 is an operation panel.

Figure 9:
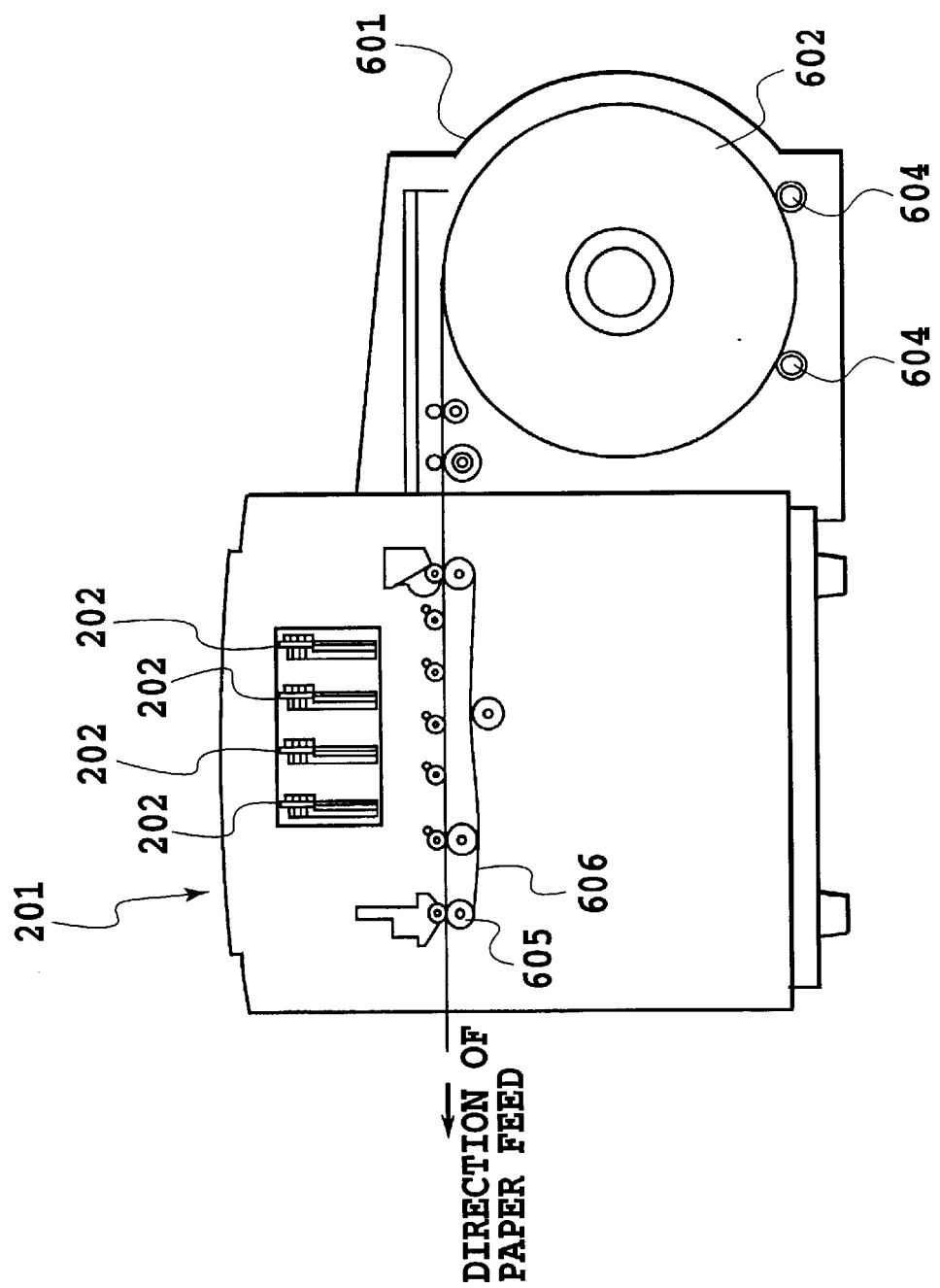
FIG. 9 is a side view showing an interior of the color label printing apparatus of FIG. 8.

FIG. 9 is a side view showing the interior of the color label printing apparatus of FIG. 8.

The color label printing apparatus feeds the roll of paper 602, a print medium held in the paper roll holder 601, to a printing apparatus body by paper roll feed rollers 604. In the printing apparatus body, the paper 602 is carried to the left in the figure, as shown by the arrow, by a transport roller 605 and a transport belt 606. Four print heads 202 are provided which correspond to four color inks, yellow, magenta, cyan and black. These four print heads 202 combine to form a head unit. The print heads 202 use these color inks supplied from corresponding color ink cartridges and print images on the paper 602.

The print heads 202 have a plurality of ink ejection orifices (not shown) formed in their surface opposing the paper 602 and arranged in a direction crossing the paper feed direction. The print heads 202 also have ink passages (not shown) communicating with individual ink ejection orifices. For each of the ink passages, the print heads are provided with an electricity-heat converter that generates thermal energy used to eject ink droplets. The electricity-heat converter generates heat by an electric pulse applied according to the print data. The heat causes film boiling which in turn generates a bubble, ejecting an ink droplet from the ink ejection orifice.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing system comprising:
    a printing apparatus capable of printing an image according to print data on a print medium by using a print head having a plurality of print elements; and
    a controller for sending the print data to the printing apparatus,
    wherein the printing apparatus has first and second holding means for holding first unique information unique to the printing apparatus and second unique information unique to the print head, respectively, and
    wherein the controller includes:
        first and second registration means capable of registering the first and second unique information sent from the printing apparatus, respectively;
        a request means for requesting the printing apparatus to send the second unique information when the registered content of the first and second registration means does not agree with the first and second unique information in the printing apparatus; and
        a conversion means for converting the print data according to the second unique information registered in the second registration means.

2. A printing system according to claim 1, wherein the request means requests the printing apparatus to send the second unique information when the second unique information is not registered in the second registration means.

3. A printing system according to claim 1, wherein the request means includes:
    a first request section for requesting the printing apparatus to send the first unique information; and
    a second request section for requesting the printing apparatus to send the second unique information when the first unique information sent from the printing apparatus in response to the request from the first request section does not agree with the registered content of the first registration means.

4. A printing system according to claim 1, wherein the printing apparatus has a plurality of the print heads and the second unique information is transferred for each print head.

5. A printing system according to claim 1, wherein the second unique information includes image conversion information used by the conversion means to convert the print data and management information for managing the image conversion information; the image conversion information and the management information are transferred separately; and the request means requests the printing apparatus to send the image conversion information according to a historical relationship between the management information sent from the printing apparatus and the management information registered in the second registration means.

6. A printing system according to claim 5, wherein, based on a historical relationship between the management information sent from the printing apparatus and the management information registered in the second registration means, the request means requests the printing apparatus to send the image conversion information for all of the print heads at one time.

7. A printing system according to claim 5, wherein the management information is a date when the image conversion information was generated.

8. A printing system according to claim 5, wherein the management information is version information representing a history of the image conversion information.

9. A printing system according to claim 5, wherein the image conversion information is print data correction data for each of the plurality of print elements.

10. A printing system according to claim 9, wherein the correction data is a correction factor of the print data.

11. A printing system according to claim 9, wherein the correction data is an index specifying a correction table and the conversion means corrects the print data according to the correction table specified by the correction data.

12. A printing system according to claim 1, wherein the first unique information is a serial number assigned to each of the printing apparatuses.

13. A printing system according to claim 1, wherein the print elements eject ink droplets from ink ejection orifices.

14. A printing system according to claim 13, wherein the print elements each have an electricity-heat converter that generates thermal energy for ejecting the ink droplets.

15. A printing method in a printing system including a printing apparatus capable of printing an image according to print data on a print medium by using a print head having a plurality of print elements and a controller for sending the print data to the printing apparatus, the controller being selectively connectable to the outside of a plurality of apparatuses, the printing method comprising the steps of:
    sending unique information to the controller from the printing apparatus connected to the controller, the unique information being unique to that printing apparatus and being unique to the print head used in that printing apparatus;
    sending print data to that printing apparatus from the controller, the print data being processed by the controller according to the unique information; and
    printing the image on the print medium according to the print data sent from the controller by that printing apparatus.

16. A printing method according to claim 15, wherein:
    the printing apparatus has a plurality of the print heads and also has, as the unique information for each print head, image conversion information and management information including version information representing a history of the image conversion information and date information representing a date when the image conversion information was generated;

the printing apparatus sends to the controller the management information including the version information and the date information for each of the plurality of print heads;

the controller compares the version information for each of the plurality of the print heads registered in the controller with the version information for each of the plurality of print heads sent from the printing apparatus;

when these version information do not agree, the management information for all of the plurality of print heads are sent from the printing apparatus to the controller to update registration;

when these version information agree, the controller compares the date information for each of the plurality of print heads registered in the controller with the date information for each of the plurality of print heads sent from the printing apparatus;

based on a result of the comparison between these date information, for each of the print heads, only the image conversion information requiring updating is sent from the printing apparatus to the controller and updates registration; and based on the image conversion information registered in the controller, the controller converts the print data and sends it to the printing apparatus.

17. A printing method according to claim 16, wherein, before sending the management information for each of the plurality of print heads to the controller, the printing apparatus sends to the controller a serial number assigned to each of the apparatuses; and when the serial number sent from the printing apparatus to the controller is not registered in the controller, the image conversion information and the management information for all of the plurality of print heads are sent from the printing apparatus to the controller and registered with the controller.

* * * * *